March 30, 1926.

R. G. COATES 1,578,957

CONNECTION FOR FIRE HOSE

Filed June 29, 1925

Inventor
Ray G. Coates.
By Lyon+Lyon
Attorneys.

Patented Mar. 30, 1926.

1,578,957

UNITED STATES PATENT OFFICE.

RAY G. COATES, OF PASADENA, CALIFORNIA.

CONNECTION FOR FIRE HOSE.

Application filed June 29, 1925. Serial No. 40,278.

*To all whom it may concern:*

Be it known that I, RAY G. COATES, a citizen of the United States, residing at Pasadena, in the county of Los Angeles and State of California, have invented a new and useful Connection for Fire Hose, of which the following is a specification.

This invention relates to hose connections of the type suitable for connecting the suction and discharge hose lines of a fire engine to a hydrant in a manner that makes it unnecessary to shut the hydrant valve and disconnect the fire hose while making the connection of the suction and discharge hose with the hydrant.

It is the common practice at present for the fire engine, which also carries the hose, when responding to a fire alarm, to run to a designated hydrant, drop a man with the end of the hose, and then run from the hydrant toward the fire, laying the hose as it goes. The fireman having the end of the hose connects it with the hydrant and turns on the water so as to fill the hose as the engine lays it, thus insuring that little time is lost in obtaining water under city pressure when the laying of the hose to the fire has been completed.

It often is necessary that a larger flow of water be utilized in fighting the fire and, in such event, it is customary to return the engine to the hydrant. Under present methods, it is often necessary to disconnect the fire hose from the hydrant and then connect the pump of the engine to the hydrant and to the fire hose.

It will be seen that valuable time is lost in fighting the fire and that this occurs at a critical time, since in the early stages of the fire every minute that water is played on the fire is of relatively great value. Stoppage of the water while making the change from city pressure to engine pressure may permit the fire to get beyond control.

In an effort to avoid the necessity for turning off the water while making the change from engine pressure to city pressure, four-way valves have been designed to be used on the hydrant end of the hose and such valves are dropped with the hose. In these valves one of the ports is connected with the hydrant and another to the hose line and the other two are connected with the pump. With these valves, when the hose is first connected with the hydrant and the water turned on, the water runs from the hydrant to the hose line. After the suction and discharge hose of the pump have been connected with the four-way valves, the valve is shifted so as to direct the water from the hydrant to the engine and from the engine to the fire hose and to shut off the passage leading from the hydrant to the fire hose. Such valves readily become leaky are liable to become damaged in handling of the hose, are very difficult to operate and are very heavy if made large enough to pass the required amount of water without undue frictional losses.

An object of this invention is to provide a hose connection of this character and of such construction that the water passages are relatively large for the weight of the connection so that ample flow will be secured and the connection will still be light enough to be readily handled with the hose.

A further object is to provide a hose connection of this character having a manually operated valve and having a valve that, when the manually operated valve is opened and the pump is operated, will automatically operate to close off the chamber connected with the pump from the passage connecting the pump discharge hose with the fire hose line.

The accompanying drawings illustrate the invention:

Figure 1:
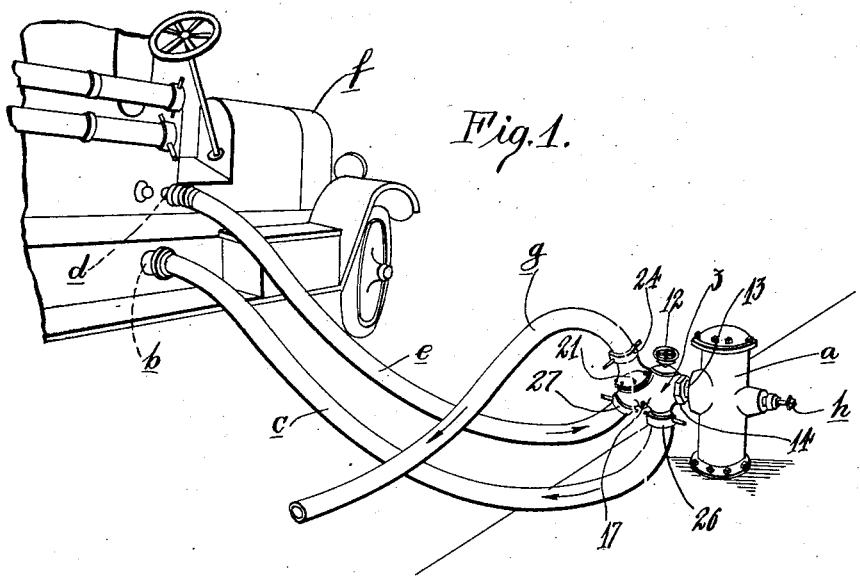
Fig. 1 is a perspective view of a connection for a fire hose constructed in accordance with the provisions of this invention, the same being shown in connection with a fire hydrant and connected by suction and discharge hose to a fire engine which is fragmentarily indicated. A fragment of the fire hose is also shown attached to the connection.

Referring, first, more particularly to Fig. 1, the hose connection is indicated, in general, at 3, and is shown coupled to a fire hydrant $a$. Connecting the connection 3 with the pump intake $b$ is a suction hose $c$ and connecting the pump discharge $d$ with the connection 3 is a hose $e$. The pump itself cannot be seen but a fragment of the fire engine of which it forms a part is indicated in general by the character $f$. Connected with the connection 3 is a fragment of fire hose $g$.

Figure 2:
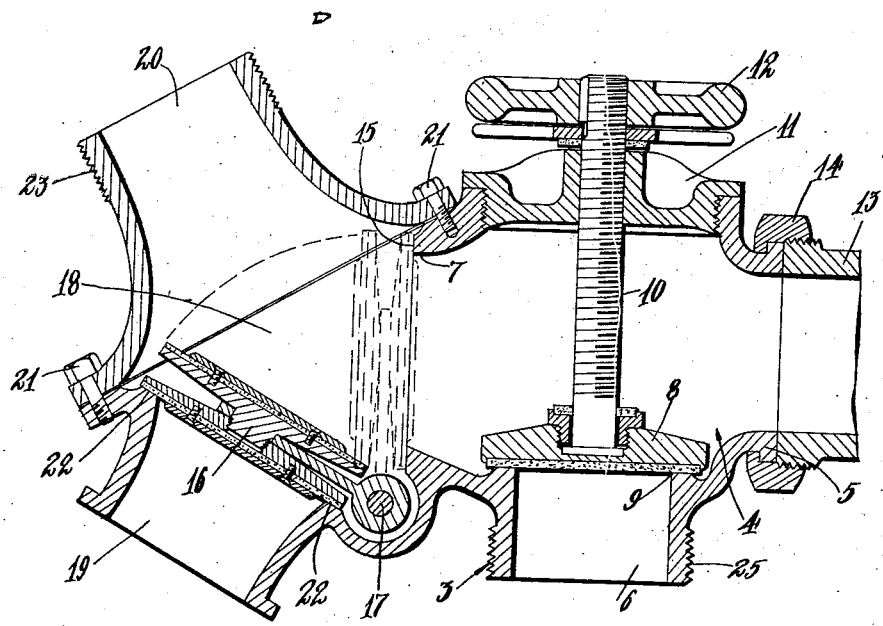
Fig. 2 is a sectional elevation of the hose connection shown in Fig. 1, the check valve being shown in one position in solid lines and being indicated in a different position in broken lines.

Referring, as well, to Fig. 2, the connection 3 comprises a chamber 4 having an inlet 5 for connection with the hydrant, an outlet 6 for connection with the suction hose, and an outlet 7 through which water may pass from the chamber 4.

The outlet 6 is controlled by a manually operated valve 8 adapted to close on a seat 9 and the valve 8 is operated by a valve stem 10 threaded through a removable cover 11 of the chamber 4. The stem 10 has an operating handwheel 12. The discharge nipple of the hydrant is indicated at 13 and is screw threaded as is customary and the intake 5 is connected with the nipple 13 by a threaded nipple 14 in a manner well understood in this art.

At the outer end of the discharge opening 7 is a valve seat 15 upon which is adapted to seat an outwardly opening automatic check valve 16. In this particular instance the check valve 16 is pivoted at one side at 17 to the chamber 4, so as to swing in an arcuate path within a valve chamber 18 which is provided with an intake 19 and an outlet 20, the pivot 17 being substantially opposite to the outlet 20. In this particular instance the wall of the intake 19 is integral with the chamber 4 and the wall of the outlet 20 is of separate construction and secured to the chamber 4 by cap screws 21 or their equivalents. The outlets 7, 20, and intake 19 together constitute a Y-shaped passage, the outlet 20 being between the outlet 7 and intake 19, and the check valve 16 not only controls the outlet 7 but it also controls the intake 19, there being a valve seat 22 surrounding the intake 19 for the check valve 16 to seat upon when in the position shown in solid lines in Fig. 2.

The outlet 20 is screw threaded at 23 to receive the usual hose coupling 24 for connecting the fire hose g with said outlet 20.

The outlet 6 is screw threaded at 25 to receive the usual hose coupling 26 for connecting the suction hose c with the outlet 6.

The intake 19 is connected by the usual hose coupling 27 with the pump discharge hose e.

The hose connection described above will be used as follows:

When the fire engine arrives at the hydrant a fireman takes one end of the hose, carried by the engine, on which end is the connection described above, and said fireman immediately makes connection between the inlet 5 and the hydrant and, assuming that the valve 8 is closed, he then opens the hydrant valve, of which the stem is indicated at h in Fig. 1. The water thus admitted from the hydrant to the chamber 4 holds the valve 16 closed on the seat 22, as in solid lines in Fig. 2, and said water passes through the outlet 20 and fire hose g to the fire. The water is under city pressure and the flow is substantially the same as would occur with the hose line connected directly with the hydrant.

If the fire is of such character as to require a greater flow of water, the engine, will be after laying the fire hose to the fire, will be returned to the hydrant and its intake port b will be connected by the hose c with the outlet 6. Also the pump intake d will be connected by the hose e with the intake 19. It will be seen that these pump connections are quickly made. A fireman will then open the valve 8 and the pump will then be started into operation and such operation will make the pressure in the intake 19 higher than that in the outlet 7 and, consequently, the valve 16 will swing from the position shown in solid lines in Fig. 2 to the broken line position in said figure, thus closing off the city pressure from the fire hose and directing the water admitted to the chamber 4 to the engine through the hose c and the pump will then force the water through the hose e into the chamber 18 whence it discharges into the fire hose g.

If the pumping operation is purposely or accidentally discontinued the water will continue to flow through the fire hose, either directly as it did before the pump was connected, or through the passages of the pump in event that the pump is of such construction as to admit this, or both through the outlet 7 and through the pump.

When the pump is not operating the pressures on opposite faces of the valve 8 are substantially equal and said valve may be closed with little effort. When so closed the engine may be disconnected without interrupting the flow of water under hydrant pressure. Very small loss of water may occur when the engine is being disconnected when the check valve moves into position to close the outlet 19, but the loss will be negligible since the check valve will move nearly, if not entirely, to its seat 22 the moment the valve 8 is closed.

I claim:

1. A connection of the character described comprising a chamber having two outlets and an inlet, a manually operated valve for one of said outlets, a passage forming an intake and an outlet, and an automatic valve, movable to close either the intake or the other outlet of the chamber.

2. A connection of the character described comprising a chamber having a removable cover and having two outlets and an inlet, a manually operated valve for one of said outlets, there being a stem for the valve threaded through the cover, a passage forming an inlet and an outlet, and an automatic valve operable by differences in pressure on opposite sides thereof to close either the intake or the other outlet of the chamber.

3. A connection of the character described comprising a chamber having an inlet adapted to be connected with a hydrant, said chamber having two outlets, a manually operated valve for one of the outlets, a passage forming an intake and an outlet, there being a valve seat at the inner end of the intake and a valve seat at the outer end of the other outlet of the chamber, and a valve closing onto one of said seats or the other according as the higher pressure is on one side or the other of the last mentioned valve.

4. A connection of the character described comprising a chamber having an inlet adapted to be connected with a hydrant, said chamber having an outlet adapted to be connected with a pump intake and said chamber having a second outlet, a manually operated valve for the first mentioned outlet, a passage forming an intake adapted to be connected with the outlet of the pump and said passage forming an outlet adapted to be connected with a fire hose, valve seats at the inner end of the second intake and at the outer end of the second outlet, and a valve automatically closed onto the seat of the second outlet by a difference in pressures on opposite sides thereof when the manually operated valve is open and the pump is in operation and closed onto the seat of the intake when the manually operated valve is closed.

Signed at Los Angeles, California, this 18 day of June 1925.

RAY G. COATES.